US008831549B2

(12) United States Patent
Lin et al.

(10) Patent No.: US 8,831,549 B2
(45) Date of Patent: Sep. 9, 2014

(54) RECEIVER CIRCUIT AND ASSOCIATED METHOD

(71) Applicant: MEDIATEK Inc., Hsin-Chu (TW)

(72) Inventors: Ang-Sheng Lin, Kaohsiung (TW); Wei-Hao Chiu, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 13/795,080

(22) Filed: Mar. 12, 2013

(65) Prior Publication Data

US 2014/0080437 A1 Mar. 20, 2014

Related U.S. Application Data

(60) Provisional application No. 61/702,340, filed on Sep. 18, 2012.

(51) Int. Cl.
| | |
|---|---|
| *H04B 1/10* | (2006.01) |
| *H04B 1/26* | (2006.01) |
| *H04B 1/16* | (2006.01) |
| *H04B 1/30* | (2006.01) |

(52) U.S. Cl.
CPC .. *H04B 1/16* (2013.01); *H04B 1/30* (2013.01); *H04B 2001/305* (2013.01)
USPC ............ 455/302; 455/304; 455/307; 455/324

(58) Field of Classification Search
USPC ........... 455/226.1, 232.1, 285, 296, 302, 303, 455/304, 307, 324
See application file for complete search history.

(56) References Cited

U.S. PATENT DOCUMENTS

| | | | | |
|---|---|---|---|---|
| 5,826,180 | A * | 10/1998 | Golan | 455/302 |
| 6,892,060 | B2 * | 5/2005 | Zheng | 455/302 |
| 7,116,965 | B2 | 10/2006 | Minnis et al. | |
| 2002/0055347 | A1 * | 5/2002 | Spargo et al. | 455/302 |
| 2006/0281432 | A1 * | 12/2006 | Isaac et al. | 455/323 |
| 2009/0088120 | A1 * | 4/2009 | Ling et al. | 455/314 |
| 2011/0243287 | A1 * | 10/2011 | Kitsunezuke | 375/350 |

OTHER PUBLICATIONS

Ken Martin: "Complex Signal Processing is Not —Complex"; Sep. 2004.
Minnis, et al.: "Non-complex signal processing in a low-If receiver for GSM"; IEE Proc-Circuits Devices Syst., vol. 149. No. 5/6, Oct./Dec. 2002.
Crols, et al.: "Low-IF Topologies for High-Performance Analog Front Ends of Fully Integrated Receivers"; IEEE Transactions on Circuits and Systems—II: Analog and Digital Signal Processing, Vol. 45, No. 3, Mar. 1998; pp. 269-282.

* cited by examiner

*Primary Examiner* — Nguyen Vo
(74) *Attorney, Agent, or Firm* — McClure, Qualey & Rodack, LLP

(57) ABSTRACT

A receiver circuit, e.g., a low-IF receiver, including two mixing paths. The two mixing paths scale an input signal respectively by two mixing gains and shift phase of the input signal respectively by two mixing phase offsets to provide two mixed signals. The two mixing gains and the two mixing phase offsets are arranged to produce an amplitude adjustment between amplitudes of the two mixed signals and a phase difference of 90 degrees plus a phase adjustment between phases of the two mixed signals. With the amplitude adjustment and/or the phase adjustment properly tuned to nonzero value(s) in association with band-pass response of the receiver circuit, image rejection can be achieved and optimized. Associated method is also disclosed.

18 Claims, 3 Drawing Sheets

$$X\_LO(t) = \cos(w\_LO*t) + j*(1+r)*\sin(w\_LO*t+dP) \quad (eq1.1)$$
$$= \cos(w\_LO*t) + j*(1+r)*( \sin(w\_LO*t)*\cos(dP) + \cos(w\_LO*t)*\sin(dP) ) \quad (eq1.2)$$
$$\approx (1+j*dP)*\cos(w\_LO*t) + j*(1+r)*\sin(w\_LO*t) \quad (eq1.3)$$
$$= ( 1 + j*\frac{dP}{2} )*\exp(j*w\_LO*t) + ( \frac{-r}{2} + j*\frac{dP}{2} )*\exp(-j*w\_LO*t) \quad (eq1.4)$$
$$= \underbrace{\sqrt{(1)^2+(\tfrac{dP}{2})^2}}_{Bi} *\exp( j*w\_LO*t + \underbrace{\tan^{-1}(\tfrac{dP}{2})}_{\angle Pi} ) + \underbrace{\sqrt{(\tfrac{-r}{2})^2 + (\tfrac{dP}{2})^2}}_{Bs} *\exp( j*w\_LO*t + \underbrace{\tan^{-1}(\tfrac{dP}{r})}_{\angle Ps} ) \quad (eq1.5)$$

$$G\_QM = \frac{Bs}{Bi} = \sqrt{\frac{(\tfrac{-r}{2})^2 + (\tfrac{dP}{2})^2}{(1)^2+(\tfrac{dP}{2})^2}} \approx \sqrt{(\tfrac{-r}{2})^2 + (\tfrac{dP}{2})^2} \quad (eq2)$$

$$P\_QM = Ps - Pi = \tan^{-1}(\tfrac{dP}{r}) - \tan^{-1}(\tfrac{dP}{2}) \approx \tan^{-1}(\tfrac{dP}{r}) \quad (eq3)$$

$$X\_IM(t) = V\_image*Gf*\cos(wif*t+Pf) + V\_image*G\_QM*\cos(wif*t+P\_QM) \quad (eq4)$$

FIG. 2

RECEIVER CIRCUIT AND ASSOCIATED METHOD

This application claims the benefit of U.S. provisional application Ser. No. 61/702,340, filed Sep. 18, 2012, the subject matter of which is incorporated herein by reference.

FIELD OF THE INVENTION

The present invention relates to a receiver circuit and associated method, and more particularly, to a receiver circuit and associated method of low hardware complexity, power consumption and layout area.

BACKGROUND OF THE INVENTION

Wired and wireless networks, such as mobile telecommunication networks, local area networks, positioning systems, broadcasting systems, sensor networks etc., have become essential for modern daily life. In a network, when a transmitter needs to send digital information to a receiver, the transmitter encodes the digital information to a digital base-band (BB) signal, converts the digital base-band signal to an analog BB signal, modulates (up-converts) the analog BB signal to a radio-frequency (RF) signal by mixing the analog base-band signal with a local oscillation (LO) signal generated by the transmitter, and amplify the RF signal, such that the RF signal can be transmitted via network medium (e.g., air for wireless network). When the receiver receives the RF signal, it amplifies the received RF signal, demodulates (down-converts) the RF signal to a demodulated signal by mixing the RF signal with a local oscillation signal generated by the receiver, such that the digital information can be retrieved from the demodulated signal.

For signal receiving, there are several kinds of receiver architectures. For example, a receiver of a heterodyne architecture down-converts RF band to an intermediate frequency (IF) band which locates between the base-band and the RF band. On the other hand, a receiver of a direct-conversion (or zero-IF) architecture directly down-converts RF band to base-band. Comparing to the direct-conversion architecture, the heterodyne architecture demonstrates advantages, and thus provides an attractive solution for signal receiving. In addition, a receiver of a heterodyne architecture can adopt a low-IF receiving scheme, wherein a lower bound of the IF band is arranged to be close to zero frequency (DC, direct current); such arrangement proves beneficial for signal receiving performance and circuitry implementation, etc.

While heterodyne architecture is advantageous, it introduces image issue during down-conversion, wherein fluctuation (noise, interferer and/or unwanted signal) in an image band is translated to the IF band which contains desired signal. The image band is mirrored from the IF band about zero frequency; that is, the image band and the IF band locate symmetrical around zero frequency. To reduce affection of the image issue, image rejection is demanded.

SUMMARY OF THE INVENTION

An objective of the invention is providing a receiver circuit, e.g., a receiver circuit adopts low-IF receiving scheme. The receiver circuit includes two mixing paths commonly coupled to an input signal (e.g., a received RF signal) for translating frequency band of the input signal, scaling the input signal respectively by two mixing gains, shifting phase of the input signal respectively by two mixing phase offsets, and accordingly providing two mixed signals in response. The two mixing gains and the two mixing phase offsets are arranged to produce an amplitude adjustment between amplitudes of the two mixed signals, as well as a phase difference of a quadrature phase (90 degrees) plus a phase adjustment between phases of the mixed signals, and wherein the amplitude adjustment or/and the phase adjustment is/are arranged to be nonzero.

The two mixed signals can respectively be regarded as a real part and an imaginary part of a complex mixed signal, and the receiver circuit can further include a filter. For example, the filter can be a complex band-pass filter which has two input terminals and two output terminals. The filter receives the two mixed signal via the input terminals, operates on the complex mixed signal formed by the two mixed signal, and accordingly provides a complex filtered signal, which includes two filtered signal as a real part and an imaginary part. Thus the two filtered signal can be outputted via the two output terminals of the filter.

For signal filtering, the filter is arranged to provide two filter gains and two filter phase offsets respectively for two frequency bands, e.g., an image band and a signal band (i.e., the IF band containing desired signal). In association with the two filter gains and two filter phase offsets, the phase adjustment and a ratio between the amplitudes of the two mixed signals can be determined according to a difference between the two filter phase offsets and a ratio between the two filter gains.

Generally, a receiver with I-Q branching has an in-phase path (I-path) and a quadrature-phase path (Q-path). With a matched I-Q branching, a received input signal experiences equally scaled down-conversions of 0-degree and 90-degree phase shift respectively through the I-path and Q-path to form two mixed signal. In one kind of image rejection, the two mixed signal of matched I-Q branching are combined to one signal by an RC phase shifter (R for resistor and C for capacitor) formed by an RC-CR circuit. However, the RC phase shifter increases power consumption and output noise, also occupies large layout area. In another kind of image rejection, the two mixed signal of matched I-Q branching are respectively converted to two digital signals by two analog-to-digital converters (ADCs), so image rejection is achieved in digital domain by digitally processing the two digital signals. However, two ADCs consume extra power and layout areas. In still another kind of image rejection cooperating with matched I-Q branching, a sophisticated band-pass filter is utilized to keep the signal band and suppress the image band, so image fluctuation in each of the two mixed signal is filtered. However, such image rejection requires a highly selective filter which has sharp transition between stop-band and pass-band, and therefore needs to be implemented by a high-order filter; an order of the filter has to be greater than 7. High-order filter demands high power and large layout area.

On the other hand, by the non-zero amplitude adjustment and/or phase adjustment, the two paths in receiver circuit of the invention are deliberately arranged to be mismatched. Owing to the non-zero amplitude adjustment and/or phase adjustment, the two mixing paths can provide two induced gains and two induced phase offsets respectively for the two frequency bands according to the two mixing gains and the two mixing phase offsets. That is, values of the two induced gains and two induced phase offsets are dependent on the two mixing gains and the two mixing phase offsets. By properly setting the two mixing gains and the two mixing phase offsets, a ratio between the two induced gains can be arranged to be a reciprocal of a ratio between the two filter gains, and a difference between the two induced phase offsets can be arranged to be 180 degrees out of phase with a difference between the two filter phase offsets. Image rejection can therefore be achieved by cooperation of the two mismatched mixing paths and the filter.

During down-conversion of the two mismatched mixing paths, a fluctuation coming with the input signal is translated, scaled by the two induced gains and shifted by the two induced phase offsets to form an image fluctuation at the image band and an in-band fluctuation at the signal band. As the filter operates on the image fluctuation and the in-band fluctuation, the image fluctuation and the in-band fluctuation are further scaled by the two filter gains and shifted by the two filter phase offsets to form a filtered image fluctuation and a filtered in-band fluctuation. Since the ratio between the two induced gains is arranged to be a reciprocal of the ratio between the two filter gains, and the difference between the two induced phase offsets is arranged to be 180 degrees out of phase with a difference between the two filter phase offsets, the filtered image fluctuation and the filtered in-band fluctuation annihilate each other for image rejection. Accordingly, the filter in the invention can be a low-order filter; an order of the filter does not have to be greater than 3. In addition, the invention only needs one ADC for converting just one of the two filtered signals to the digital domain.

An objective of the invention is providing a receiver circuit including a mixing block, a filter and an adjustment module. The mixing block is coupled to an input signal, and arranged to translate frequency band of the input signal, to scale the input signal respectively by two mixing gains, to shift phase of the input signal respectively by two mixing phase offsets, and to accordingly provide two mixed signals in response. The filter is coupled to the mixing block, and arranged to provide two filter gains and two filter phase offsets respectively for two frequency bands, e.g., the image band and the signal band; wherein the two mixing gains and the two mixing phase offsets are determined according to the two filter gains and the two filter phase offsets. As the mixing block can provide two induced gains and two induced phase offsets respectively for the two frequency bands according to the two mixing gains and the two mixing phase offsets, the adjustment module is arranged to set the two mixing gains and the two mixing phase offsets, such that a ratio between the two induced gains is arranged to be a reciprocal of a ratio between the two filter gains, and a difference between the two induced phase offsets is arranged to be 180 degrees out of phase with a difference between the two filter phase offsets.

An objective of the invention is providing a receiver circuit including a mixing block, a filter and an adjustment module. The mixing block is arranged to translate a frequency band of an input signal, to scale the input signal respectively by two mixing gains and to shift phase of the input signal respectively by two mixing phase offsets, such that a fluctuation coming with the input signal is translated according to the mixing gains and the mixing phase offsets to form an image fluctuation at an image band and an in-band fluctuation at a signal band. The filter is coupled to the mixing block and arranged to provide two filter gains and two filter phase offsets respectively for the signal band and the image band, and to accordingly provide a filtered image fluctuation and a filtered in-band fluctuation respectively in response to the image fluctuation and the in-band fluctuation. The adjustment module is arranged to set the two mixing gains and the two mixing phase offsets, so as to suppress a combination (e.g., sum) of the filtered in-band fluctuation and the filtered image fluctuation.

An objective of the invention is providing a method applied to a receiver circuit. The receiver circuit includes two mixing paths and a filter; the two mixing paths are arranged to translate frequency band of an input signal, to scale the input signal by two mixing gains, to shift phase of the input signal by two mixing phase offsets, and to accordingly provide two mixed signal in response. The receiver circuit is arranged to provide an output signal in response to the two mixed signals. The method includes: receiving a test signal as the input signal, adjusting a mismatch setting which controls an amplitude difference between amplitudes of the two mixed signals and a phase difference between phases of the two mixed signals, observing amplitude of the output signal while adjusting the mismatch setting, and memorizing an optimal mismatch setting which minimizes amplitude of the output signal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 2 illustrates relation between mismatch and image rejection according to an embodiment of the invention.

DETAILED DESCRIPTION OF PREFERRED EMBODIMENTS

Figure 1:
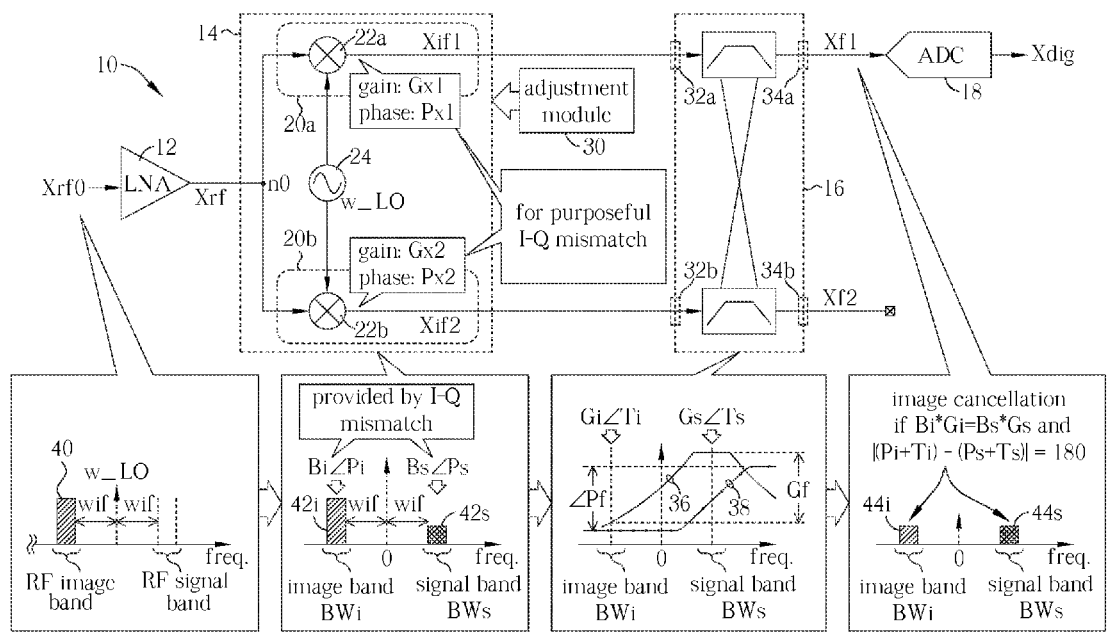
FIG. 1 illustrates a receiver circuit according to an embodiment of the invention.

Please refer to FIG. 1 illustrating a receiver circuit 10 according to an embodiment of the invention; for example, the receiver circuit 10 can be a wireless RF receiver adopts low-IF receiving scheme. The receiver circuit 10 includes an amplifier 12 (e.g., a low-noise amplifier, LNA), a mixing block 14, an adjustment module 30, a filter 16 and an ADC 18. A signal Xrf0 received by the receiver circuit 10 is inputted to the amplifier 12 and amplified to a signal Xrf at a node n0. The mixing block 14 includes two mixing paths 20a and 20b; correspondingly, the filter 16, e.g., a complex band-pass filter, has two input terminals 32a and 32b, and two output terminals 34a and 34b. The mixing path 20a is coupled between the node n0 and the input terminal 32a, and the mixing path 20b is coupled between the node n0 and the input terminal 32b. The ADC 18 is coupled to the output terminal 34a.

In the mixing block 14, the mixing path 20a is arranged to translate frequency band of the signal Xrf, to scale the signal Xrf by a gain Gx1 (a mixing gain), to shift phase of the signal Xrf by a phase offset Px1 (a mixing phase offset) and to accordingly provide a signal Xif1 as a mixed signal. For example, the mixing path 20a can include a mixer 22a for mixing the signal Xrf with an oscillation signal equivalent to (or dominated by) $A*\cos(w\_LO*t+P)$, wherein the quantity A is amplitude, the quantity P is phase, the function $\cos(\bullet)$ is the cosine function, the variable t represents time, and the frequency w_LO is oscillated by a local oscillator 24, e.g., a voltage controlled oscillator (VCO) of a phase lock loop (PLL, not shown). Similarly, the mixing path 20b is arranged to translate frequency band of the signal Xrf, to scale the signal Xrf by a gain Gx2, to shift phase of the signal Xrf by a phase offset Px2 and to form a signal Xif2 as another mixed signal in response. As the mixing path 20a equivalently mixes the signal Xrf with the oscillation signal A*cos(w_LO*t+P), the mixing path 20b is purposely tuned to mix the signal with another oscillation signal A*(1+r)*cos(w_LO*t+P+90+dP) or A*(1+r)*sin(w_LO*t+P+dP) by a mixer 22b, wherein the function sin(•) is the sine function. That is, the two phase offsets Px1 and Px2 along with the two gains Gx1 and Gx2 of the two mixing paths 20a and 20b are deliberately arranged to cause a phase difference (90+dP) between phases of the signals Xif1 and Xif2, as well as an amplitude difference r*A between amplitudes of the signals Xif1 and Xif2. As the 90 degrees in the phase difference (90+dP) is a quadrature phase difference, the additional phase difference dP can be regarded as a phase adjustment for tuning a phase mismatch of I-Q branching, and similarly the amplitude difference r*A is an amplitude adjustment for an amplitude mismatch of I-Q branching.

To implement image rejection of the invention, the phase adjustment dP and/or the amplitude adjustment A*r will be purposely set to nonzero, thus the two paths 20a and 20b can be regarded as a pair of mismatched I-path and Q-path, with the mismatch now a well-design target. The adjustment module 30 is arranged to control the mismatch by setting the gains (Gx1, Gx2) and the phase offsets (Px1, Px2) of the two mixing paths 20a and 20b.

By frequency band translation of the two mixing paths 20a and 20b, the signal Xrf is converted (e.g., down-converted) to the signals Xif1 and Xif2. The signals Xif1 and Xif2 can be respectively regarded as a real part and an imaginary part of a complex mixed signal, which is processed by the filter 16 as the signals Xif1 and Xif2 are inputted to the filter 16 via the input terminals 32a and 32b. In response, the filter 16 outputs two signals Xf1 and Xf2, as two filtered signal, via the output terminals 34a and 34b. Although the signals Xf1 and Xf2 can be regarded as a real part and an imaginary part of a complex filtered signal, only one of the signals Xf1 and Xf2 is chosen to be converted to digital domain for information retrieving; the other not chosen can be ignored. As will be further discussed later, cooperation of the mixing block 14 and the filter 16 will suppress image issue within the signals Xf1 and Xf2, hence signal receiving can directly proceed to digital domain from the filter 16, rather than combines the signals Xf1 and Xf2 by an RC phase shifter for canceling image before digital domain, or converts both the signals Xf1 and Xf2 by two ADCs for rejecting image in digital domain. In the example of FIG. 1, the signal Xf1 is chosen to be converted to a digital output signal Xdig by the single ADC 18.

To illustrate image rejection of the invention, consider a fluctuation 40 (noise, interferer and/or unwanted signal) received at a RF image band opposite to an RF signal band around the frequency w_LO, as shown in spectrum of FIG. 1; wherein the RF signal band is allocated for signal carrying desired information. As the fluctuation 40 coming with the signal Xrf0 (or Xrf) is down-converted by the mixing block 14 with the intentional imbalance between gains and phase offsets of the two mixing paths 20a and 20b, the fluctuation 40 at the RF image band contributes to a fluctuation 42i (an image fluctuation) at a image band BWi and a fluctuation 42s (an in-band fluctuation) at a signal band BWs, wherein the image band BWi and the signal band BWs locate symmetrically around zero frequency with a frequency separation wif. By the intended mismatch between the two mixing paths 20a and 20b, the mixing block 14 can equivalently provide two gains Bi and Bs (as induced gains) alone with two phase offsets Pi and Ps (as induced phase offsets) respectively for the image band BWi and the signal band BWs. Accordingly, the fluctuation 40 is translated to the image band BWi, scaled by the gain Bi, shifted by the phase offset Pi and therefore forms the fluctuation 42i (as an image fluctuation). Similarly, the fluctuation 40 is translated to the signal band BWs, scaled by the gain Bs, shifted by the phase offset Ps and forms the fluctuation 42s (as an in-band fluctuation).

Cooperating with the two mixing paths 20a and 20b, the filter 16 is arranged to implement an asymmetric (around zero frequency) response in frequency domain. Hence, the response of the filter 16, represented by a magnitude response 36 and a phase response 38 in FIG. 1, can provide two gains Gi and Gs (as filter gains) along with two phase offsets Ti and Ts (as filter phase offsets) respectively for the image band BWi and the signal band BWs. Accordingly, the fluctuation 42i is scaled by the gain Gi and shifted by the phase offset Ti to form a fluctuation 44i as a filtered image fluctuation, and the fluctuation 42s is scaled by the gain Gs and shifted by the phase offset Ts to form a fluctuation 44s as a filtered in-band fluctuation. That is, by cooperation of the mixing block 14 and the filter 16, the fluctuation 40 experiences an overall gain Bi*Gi and a total phase offset (Pi+Ti) to form the fluctuation 44i, and experiences an overall gain Bs*Gs and a total phase offsets (Ps+Ts) to form the fluctuation 44s. With gains Bi*Gi equal to Bs*Gs and phase offsets (Pi+Ti) and (Ps+Ts) out of phase by 180 degrees, the fluctuations 44s and 44i annihilate each other, and image rejection is therefore achieved. By tuning the gains (Gx1, Gx2) and the phase offsets (Px1, Px2), the adjustment module 30 can control the amplitudes (A, A*(1+r)) and the phases (P, (P+90+dP)) to manipulate the gains Bi, Bs and the phase offsets Pi, Ps, such that a ratio Bs/Bi can be consequently adjusted to a ratio Gf=Gi/Gs to let Bi*Gi=Bs*Gs, and a difference (Pi−Ps) can be arranged to differ from a difference Pf=(Ti−Ts) by 180 degrees to cause |(Pi+Ti)−(Ps+Ts)|=180.

Following the embodiment in FIG. 1, please refer to FIG. 2 illustrating how mismatch (e.g., amplitudes (A, A*(1+r)) and phases (P, P+90+dP)) of the two mixing paths 20a and 20b relates to the gains (Gi, Gs) and phase offsets (Pi, Ps) at the bands BWi and BWs, and how image rejection can be achieved by cooperation of the mixing block 14 and the filter 16. Without losing generality, signal mixing effect of the two mixing paths 20a and 20b can be expressed by a complex signal X_LO(t) in equation (eq1.1), wherein j is square root of (−1), and the mixing paths 20a and 20b respective contribute to real part and imaginary part of the signal X_LO(t). As shown in derivation from equations (eq1.2) to (eq1.5) as well as (eq. 2) and (eq. 3), it is recognized that the amplitude adjustment r and the phase adjustment dP between the two mixing paths 20a and 20b control the gains (Bi, Bs) and the phase offsets (Pi, Ps) provided for the bands BWi and BWs, and therefore also control a gain ratio G_QM=Bs/Bi and a phase difference P_QM=(Ps−Pi) between the two bands BWs and BWi, wherein the gain ratio G_QM and the phase difference P_QM respectively represent an additional gain and an additional phase offset experienced by the fluctuation 42s (FIG. 1) comparing to the fluctuation 42i. On the other hand, by frequency response of the filter 16, the fluctuation 42i experiences an additional gain and an additional phase offset respectively represented by the ratio Gf=Gi/Gs and the phase difference Pf=(Ti−Ts) comparing to the fluctuation 42s. Owing to cooperation of the mixing block 14 and the filter 16, the filtered fluctuations 44i and 44s can then be respectively expressed by V_image*Gf*cos(wif*t+Pf) and V_image*G_QM*cos(wif*t+P_QM), as shown in equation (eq4), wherein the factor V_image is magnitude of the fluctuation 40. With Gf=G_QM and |Pf−P_QM|=180 or equivalently Bi*Gi=Bs*Gs and |(Pi+Ti)−(Ps+Ts)|=180, the fluctuations 44*i* and 44*s* annihilate each other to suppress an overall fluctuation X_IM(t) induced by image, as shown by equation (eq4).

That is, image rejection can be accomplished by arranging the gains (Gx1, Gx2) and the phase offsets (Px1, Px2) of the mixing block 14 according to frequency response (e.g., the gains (Gs, Gi) and the phase offsets (Ts, Ti)) of the filter 16, such that a ratio Bs/Bi between the gains (Bs, Bi) can be a reciprocal of a ratio Gs/Gi between the gains (Gs, Gi) to cause Bs*Gs=Bi*Gi, and a difference (Ps−Pi) between the two offsets (Ps, Pi) is arranged to be 180 degrees out of phase with a difference (Ts−Ti) between the two offsets (Ts, Ti) to let |(Ps−Ts)−(Pi−Ti)|=180.

There are several embodiments can be adopted, alone or in combination, to provide the gains (Gx1, Gx2) and the phase offsets (Px1, Px2) for implementing the amplitudes (A, A*(1+r)) and the phases (P, P+90+dP) of the two mixing paths 20*a* and 20*b* (FIG. 1). For example, the oscillator 24 can be arranged to generate two oscillation signals which oscillate at the same frequency w_LO but differ in phase by 90+dP. In an embodiment, the two oscillation signals can be respectively scaled to implement the amplitude difference r*A and fed to the mixer 22*a* and 22*b* to be mixed with the signal Xrf. In an embodiment, the signals Xrf can be respectively scaled to implement the amplitude difference r*A along the two mixing paths 20*a* and 20*b*, and then mixed with the two oscillation signals which differ in phase but equal in amplitude. In an embodiment, the signals Xrf can be mixed with the two oscillation signals of different phases and equal amplitude to form two mixed signals, and the two mixed signals are respectively scaled to implement effect of the amplitude difference r*A. In an embodiment, while respectively mixing the signal Xrf with the two oscillation signals of different phases and equal amplitude, the mixers 22*a* and 22*b* respectively scale their mixing result to implement effect of the amplitude difference r*A.

Figure 3:
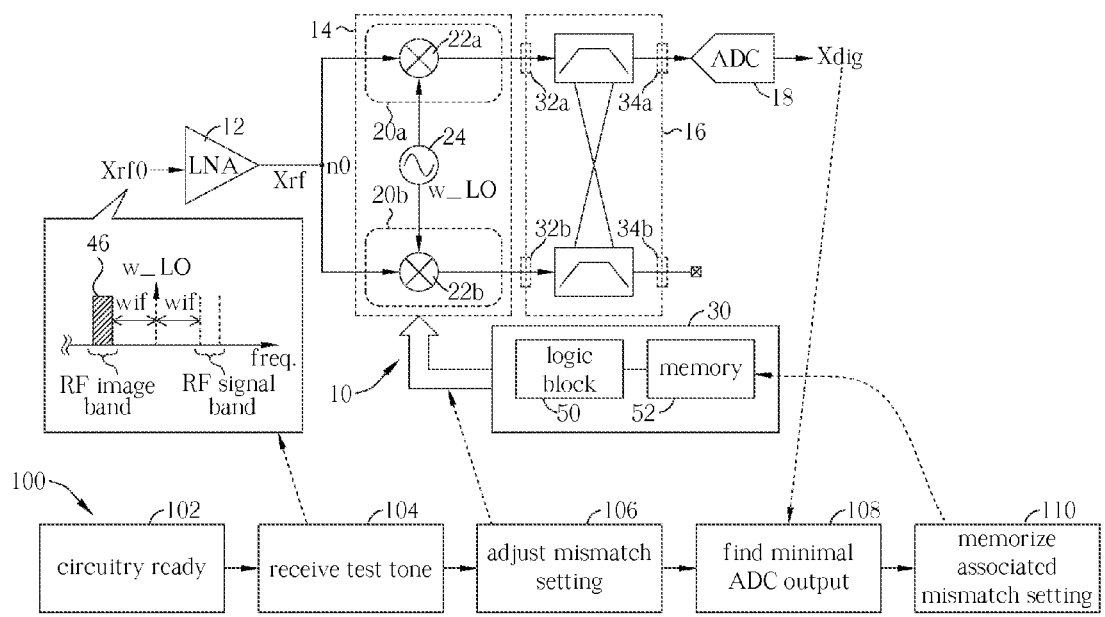
FIG. 3 illustrates a flow applied to the receiver circuit in FIG. 1 according to an embodiment of the invention.

Please refer to FIG. 3 illustrating a flow 100 applied to the receiver circuit 10 (FIG. 1) of the invention. For example, the flow 100 can be a test/calibration procedure employed to find an optimal mismatch setting (e.g., including the gain difference r and phase difference dP) which optimizes effect of image rejection, so the found optimal mismatch setting can be adopted during normal receiving operation of the receiver circuit 10. Major steps of the flow 100 can be described as follows.

Step 102: set the receiver circuit 10 ready for test.

Step 104: use the receiver circuit 10 to receive a test signal as the signal Xrf0. The test signal can be a sinusoidal test tone which oscillates at a frequency of the RF image band to emulate an image fluctuation, e.g., the fluctuation 40 in FIG. 1. The test signal can be generated by an external tester (testing equipment or signal generator) or an internal signal transmitter circuit (not shown) integrated with the receiver circuit 10.

Step 106: adjust the mismatch setting to different values to test different mismatch settings of the mixing block 14, and observe corresponding resultant amplitudes (e.g., peak-to-peak amplitude) of the signal Xdig.

Step 108: among the various mismatch settings tested during step 106, find the mismatch setting which minimizes the amplitude of the signal Xdig to be the optimal mismatch setting. Because the test signal emulates image fluctuation, the mismatch setting leading to minimal resultant ADC output signal Xdig suppresses image the most, and therefore becomes the optimal mismatch setting which maximizes effect of image rejection. The resultant signal Xdig of different mismatch settings can be outputted to an external tester for comparison, or the resultant signal Xdig can be compared by an internal controller, e.g., a digital base-band processor.

Step 110: record the optimal mismatch setting. In an embodiment, the adjustment 30 can include a logic block 50 and a memory 52, so the memory 52 can be utilized to memorize the optimal mismatch setting. When the receiver circuit 10 performs its normal signal receiving function after the flow 100 ends, the logic block 50 can then fetch the optimal mismatch setting from the memory 52, such that the adjustment module 30 can accordingly control the two mixing paths 20*a* and 20*b* to cooperate with frequency response of the filter 16 for image rejection. The memory 52 can be a one-time programmable non-volatile memory, such as embedded fuses; or the memory 52 can be a re-writable non-volatile memory, like an electrically erasable PROM (programmable read-only memory). Functions of the logic block 50 can be implemented by hardware, firmware and software alone or in combination. For example, the functions of the logic block 50 can be performed by an internal controller executing a corresponding firmware/software. The logic block 50 can also be a stand-alone circuit.

According to the optimal mismatch setting, the adjustment module 30 can properly set the gains (Gx1, Gx2) and the phase offsets (Px1, Px2), so as to suppress a combination (e.g., sum) of the filtered in-band fluctuation 44*s* and the filtered image fluctuation 44*i* (FIG. 1) for image rejection.

There are several alternative ways to implement steps 106 and 108. For example, several different gain settings (with each gain setting including the gains (Gx1, Gx2)) can be first tested with the phase setting (including given phase offsets (Px1, Px2)) kept fixed to find an initial optimal gain setting, then several different phase settings can be tested with the initial optimal gain setting maintained to find an initial optimal phase setting, and different gain settings are tested with the initial optimal phase setting maintained to find a second optimal gain setting, so the second optimal gain setting and the initial optimal phase setting are recorded as the optimal mismatch setting. That is, varying the gain setting while fixing the phase setting and varying the phase setting while fixing the gain setting can be orderly alternated one or more times to find the optimal mismatch setting. Alternatively, each gain setting Gx[n] among N different gain settings Gx[1] to Gx[N] can be paired with a phase setting Px[m] arbitrarily selected among M different gain settings Px[1] to Px[M] to form one of N*M mismatch settings, so the optimal mismatch setting can be selected from these N*M mismatch settings by comparing the resultant amplitudes of the signal Xdig.

The receiver circuit 10 can be designed to handle different receiving scenarios, each scenario associates with its own oscillation frequency w_LO and/or IF setting (e.g., amount of the frequency separation wif shown in FIG. 1 and/or frequency response of the filter 16). That is, different scenarios can correspond to different oscillation frequencies w_LO and/or IF settings. As different oscillation frequencies w_LO and/or IF settings may demand different optimal mismatch settings to maximize effect of image rejection, different scenarios can be cataloged to several groups; the scenarios of a same group can have close/similar oscillation frequencies w_LO and/or IF settings, so they can share a same optimal mismatch setting. Accordingly, the flow 100 can be repeated for a representative oscillation frequency w_LO and a representative IF setting of each group, so as to find an optimal mismatch setting for each group; the memory 52 will record the optimal mismatch settings for all the groups. When the receiver circuit 10 is applied to a given receiving scenario, the logic block 50 checks which group the given scenario belongs to, and then fetches the mismatch setting of the group for image rejection.

To sum up, the embodiments of the invention provide receiver circuits which can implement image rejection by arranging a purposeful mismatch between I-Q branching to cooperate with frequency response of band-pass filter. The receiver circuit can therefore adopt only one ADC after a low-order band-pass filter, instead of two ADCs or an RC phase shifter associated with a high-order band-pass filter. Accordingly, hardware complexity, current dissipation, power consumption and layout area of the receiver circuit can be effectively reduced according to the invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A receiver circuit comprising:
    two mixing paths commonly coupled to an input signal for scaling the input signal respectively by two mixing gains, shifting phase of the input signal respectively by two mixing phase offsets, and accordingly providing two mixed signals in response; and
    a filter coupled to the two mixing paths, and arranged to provide two filter gains and two filter phase offsets respectively for two frequency bands;
    wherein the two mixing gains and the two mixing phase offsets are arranged to produce an amplitude adjustment between amplitudes of the two mixed signals and a phase difference of 90 degrees plus a phase adjustment between phases of the two mixed signals, and at least one of the amplitude adjustment and the phase adjustment is arranged to be nonzero; and
    wherein the phase adjustment and a ratio between the amplitudes of the mixed signals are determined according to a difference between the two filter phase offsets and a ratio between the two filter gains.

2. The receiver circuit of claim 1, wherein the two mixing paths are further arranged to provide two induced gains and two induced phase offsets respectively for the two frequency bands according to the two mixing gains and the two mixing phase offsets; a ratio between the two induced gains is arranged to be a reciprocal of a ratio between the two filter gains, and a difference between the two induced phase offsets is arranged to be 180 degrees out of phase with a difference between the two filter phase offsets.

3. The receiver circuit of claim 2, wherein the two frequency bands are symmetrically located around zero frequency.

4. The receiver circuit of claim 1, wherein the filter is a complex band-pass filter.

5. The receiver circuit of claim 1, wherein an order of the filter is not greater than 3.

6. The receiver circuit of claim 1, wherein the receiver circuit is arranged to adopt low-IF (intermediate frequency) receiving scheme.

7. A receiver circuit comprising:
    a mixing block coupled to an input signal for scaling the input signal respectively by two mixing gains, shifting phase of the input signal respectively by two mixing phase offsets, and accordingly providing two mixed signals in response; and
    a filter coupled to the mixing block for providing two filter gains and two filter phase offsets respectively for two frequency bands; wherein the two mixing gains and the two mixing phase offsets are determined according to the two filter gains and the two filter phase offsets, and the mixing block is further arranged to provide two induced gains and two induced phase offsets respectively for the two frequency bands according to the mixing gains and the mixing phase offsets; and
    an adjustment module for setting the two mixing gains and the two mixing phase, such that a ratio between the two induced gains is arranged to be a reciprocal of a ratio between the two filter gains, and a difference between the two induced phase offsets is arranged to be 180 degrees out of phase with a difference between the two filter phase offsets.

8. The receiver circuit of claim 7, wherein the two frequency bands are symmetrically located around zero frequency.

9. The receiver circuit of claim 7, wherein the filter is a complex band-pass filter.

10. The receiver circuit of claim 7, wherein an order of the filter is not greater than 3.

11. The receiver circuit of claim 7, wherein the receiver circuit is arranged to adopt low-IF receiving scheme.

12. A receiver circuit comprising:
    a mixing block coupled to an input signal for scaling the input signal respectively by two mixing gains and shifting phase of the input signal respectively by two mixing phase offsets, such that a fluctuation coming with the input signal is translated according to the mixing gains and the mixing phase offsets to form an image fluctuation at an image band and an in-band fluctuation at a signal band;
    a filter coupled to the mixing block, and arranged to provide two filter gains and two filter phase offsets respectively for the signal band and the image band, and to accordingly provide a filtered image fluctuation and a filtered in-band fluctuation respectively in response to the image fluctuation and the in-band fluctuation; and
    an adjustment module for setting the two mixing gains and the two mixing phase offsets to suppress a combination of the filtered in-band fluctuation and the filtered image fluctuation.

13. The receiver circuit of claim 12, wherein the image band and the signal band are symmetrically located around zero frequency.

14. The receiver circuit of claim 12, wherein an order of the filter is not greater than 3.

15. The receiver circuit of claim 12, wherein the receiver circuit is arranged to adopt low-IF receiving scheme.

16. A method applied to a receiver circuit, the receiver circuit comprising two mixing paths; the two mixing paths arranged to respectively scale an input signal by two mixing gains, to shift phase of the input signal by two mixing phase offsets, and to accordingly provide two mixed signals in response; the receiver circuit arranged to provide an output signal in response to the two mixed signals, and the method comprising:
    receiving a test signal as the input signal;
    adjusting a mismatch setting which controls an amplitude difference between amplitudes of the two mixed signals and a phase difference between phases of the two mixed signals.

17. The method of claim 16 further comprising:
while adjusting the mismatch setting, observing amplitude of the output signal.

18. The method of claim 17 further comprising:
memorizing an optimal mismatch setting which minimizes amplitude of the output signal.

* * * * *